United States Patent
Friggstad

(10) Patent No.: US 10,537,052 B2
(45) Date of Patent: Jan. 21, 2020

(54) MULTI-FUNCTION HYDRAULIC CONTROL OF TOOL CARRIER ASSEMBLY

(71) Applicant: Pillar Lasers Inc., Warman (CA)

(72) Inventor: Terrance A. Friggstad, Grasswood (CA)

(73) Assignee: Pillar Lasers Inc., Warman (CA)

( * ) Notice: Subject to any disclaimer, the term of this patent is extended or adjusted under 35 U.S.C. 154(b) by 38 days.

(21) Appl. No.: 15/909,335

(22) Filed: Mar. 1, 2018

(65) Prior Publication Data
US 2018/0295769 A1    Oct. 18, 2018

(30) Foreign Application Priority Data
Apr. 18, 2017   (CA) ...................................... 2964427

(51) Int. Cl.
*A01B 73/04*        (2006.01)
(52) U.S. Cl.
CPC ................... *A01B 73/048* (2013.01)
(58) Field of Classification Search
CPC ..... A01B 73/048; A01B 63/008; A01B 63/32; A01B 63/114
See application file for complete search history.

(56) References Cited

U.S. PATENT DOCUMENTS

| | | | | |
|---|---|---|---|---|
| 3,106,254 A | * | 10/1963 | Clark | A01B 23/043 172/474 |
| 3,651,870 A | * | 3/1972 | Calkins | A01B 39/19 172/44 |
| 4,690,223 A | * | 9/1987 | Haukaas | A01B 39/19 172/44 |
| 5,234,060 A | * | 8/1993 | Carter | A01C 7/205 172/260.5 |
| 5,689,906 A | * | 11/1997 | Dillman | A01B 13/02 172/177 |
| 6,209,657 B1 | | 4/2001 | Friggstad | |
| 6,371,216 B1 | | 4/2002 | Friggstad | |
| 6,684,962 B1 | | 2/2004 | Lewallen | |
| 7,261,048 B1 | * | 8/2007 | Hantke | A01B 63/32 111/136 |
| 7,581,597 B2 | | 9/2009 | Neudorf et al. | |

(Continued)

OTHER PUBLICATIONS

Canadian Office Action dated Mar. 5, 2019 for Application No. CA 2,964,427, 7 pgs.

*Primary Examiner* — Tara Mayo-Pinnock
(74) *Attorney, Agent, or Firm* — Frost Brown Todd LLC

(57) ABSTRACT

A tool carrier has a carrier frame and ground tools, and a front end of the carrier frame is connected to a wheel supported tool bar frame. A crank arm is pivotally attached to the tool bar frame about a crank axis oriented horizontally and perpendicular to an operating direction. A front end of the carrier frame is pivotally attached to the crank arm about a carrier axis parallel to the crank axis, and a hydraulic cylinder attached between the crank arm and the tool bar moves the tool carrier from an upward transport orientation to a rearward extending horizontal operating orientation, and maintains the tool carrier horizontal while moving it from a headland position above the ground to a working position where the tools penetrate the ground. When the tool carrier assembly is in the working position, the hydraulic cylinder exerts a downward bias force on the tool carrier.

22 Claims, 9 Drawing Sheets

(56) References Cited

U.S. PATENT DOCUMENTS

| | | | |
|---|---|---|---|
| 7,921,931 B2* | 4/2011 | Henry | A01B 61/046 |
| | | | 111/151 |
| 8,567,517 B2 | 10/2013 | Friggstad et al. | |
| 9,198,342 B2 | 12/2015 | Friggstad | |
| 9,554,497 B2 | 1/2017 | Sudbrink et al. | |
| 2007/0163791 A1 | 7/2007 | Meek | |
| 2010/0025056 A1* | 2/2010 | Friggstad | A01B 73/048 |
| | | | 172/452 |
| 2014/0069670 A1* | 3/2014 | Friesen | A01B 73/048 |
| | | | 172/311 |

* cited by examiner

MULTI-FUNCTION HYDRAULIC CONTROL OF TOOL CARRIER ASSEMBLY

CROSS-REFERENCE TO RELATED APPLICATION

This application claims priority to and benefit of CA Serial No. 2,964,427, filed Apr. 18, 2017, the contents of which are incorporated by reference in their entirety for all purposes.

FIELD OF THE INVENTION

This disclosure relates to the field of agricultural implements and in particular an implement with tool carrier frames pivotally mounted on a tool bar frame and movable from an operating position extending rearward from the tool bar frame to a transport position extending upward from the tool bar frame.

BACKGROUND

Wide agricultural implements typically include wing frames extending laterally from a center of the implement where each wing frame is pivotally attached to the adjacent wing frame about a horizontal pivot axis aligned with the operating travel direction such that each wing frame can pivot up and down with respect to the next to follow ground contours and maintain a desired depth of ground penetration of ground engaging tools such as furrow openers.

One common type of winged implement comprises a tool bar frame comprising a plurality of laterally extending wing frames, and then tool carrier frames pivotally mounted to the tool bar frame such that the carrier frames extend generally horizontally from the tool bar when in the operating position and upward when in the transport position. The carrier frames can extend horizontally rearward of the tool bar as in U.S. Pat. No. 7,581,597 to Neudorf et al., U.S. Pat. No. 8,567,517 to Friggstad et al., or forward of the tool bar as in U.S. Pat. No. 9,198,342 to Friggstad.

For transport, the wing frames can fold rearward as disclosed for example in U.S. Pat. No. 7,581,597 to Neudorf et al., U.S. Pat. No. 8,567,517 to Friggstad et al., and U.S. Pat. No. 9,198,342 to Friggstad, or forward, as disclosed in U.S. Pat. No. 6,371,216 to Friggstad and U.S. Pat. No. 9,554,497 to Sudbrink et al. and in United States Published Patent Application Number 2007/0163791 of Meek.

Ground engaging tools such as furrow openers are attached to each carrier frame and are moved into and out of engagement with the ground surface. In the implement of U.S. Pat. No. 8,567,517 to Friggstad et al. each ground engaging tool is pivotally attached to the carrier frame which remains horizontal and stationary at a defined vertical location with respect to the ground when in the operating position. The ground engaging tools pivot up and down with respect to the carrier frame to engage or disengage the ground. In the implement of U.S. Pat. No. 6,371,216 to Friggstad, the ground engaging tools are fixed to the carrier frame which is maintained at a horizontal orientation and moved up and down to engage and disengage the tools with the ground.

BRIEF SUMMARY

The present disclosure provides an implement apparatus that overcomes problems in the prior art.

In a first embodiment the present disclosure provides an implement apparatus comprising a tool bar frame mounted on tool bar wheels for travel along a ground surface in an operating travel direction. A tool carrier assembly comprises a carrier frame and a plurality of ground engaging tools mounted thereon, and the carrier frame is connected at a front end thereof to the tool bar frame by a carrier control assembly. The carrier control assembly comprises a crank arm pivotally attached to a rear portion of the tool bar frame about a crank axis oriented substantially horizontally and perpendicular to the operating travel direction, and an extendable hydraulic cylinder attached between the crank arm and the tool bar frame and operative to pivot the crank arm about the crank axis. The carrier frame is pivotally attached at a front end thereof to the crank arm about a carrier axis oriented substantially parallel to the crank axis, and the carrier control assembly is configured to move the tool carrier assembly from a transport orientation extending upward from the tool bar frame to an operating orientation extending substantially horizontally rearward from the tool bar frame, and to maintain the tool carrier assembly in the operating orientation while moving the tool carrier assembly from a headland position, where the ground engaging tools are above the ground, down to a working position where the ground engaging tools penetrate the ground surface. The carrier control assembly is configured such that when the tool carrier assembly is in the working position, the hydraulic cylinder is operative to exert a downward bias force on the tool carrier assembly.

In a second embodiment the present disclosure provides an implement apparatus comprising a tool bar frame mounted on tool bar wheels for travel along a ground surface in an operating travel direction. A tool carrier assembly comprises a carrier frame and a plurality of ground engaging tools mounted thereon. A carrier control assembly comprises a crank arm pivotally attached to a rear portion of the tool bar frame about a crank axis oriented substantially horizontally and perpendicular to the operating travel direction, and an extendable hydraulic cylinder attached between the crank arm and the tool bar frame and operative to pivot the crank arm about the crank axis. The carrier frame is pivotally attached at a front end thereof to the crank arm about a carrier axis oriented substantially parallel to the crank axis and the carrier control assembly is configured such that when the hydraulic cylinder is in an extended position the tool carrier assembly is in a transport orientation extending upward from the tool bar frame, and such that retracting the hydraulic cylinder to a first retracted position moves the tool carrier assembly to an operating orientation extending substantially horizontally rearward from the tool bar frame. The carrier control assembly is configured such that the tool carrier assembly is maintained in the operating orientation when the hydraulic cylinder is further retracted from the first retracted position to move the tool carrier assembly from a headland position, where the ground engaging tools are above the ground, down to a working position where the ground engaging tools penetrate the ground surface; and the carrier control assembly is configured such that when the tool carrier assembly is in the working position, pressurized hydraulic fluid is directed into the hydraulic cylinder such that the hydraulic cylinder exerts a downward bias force on the tool carrier assembly and such that hydraulic fluid moves in and out of the hydraulic cylinder as the tool carrier assembly moves up and down and the hydraulic cylinder extends and retracts in response to elevation changes in the ground surface.

The carrier control assembly thus provides a desirable downward bias force on the tool carrier assembly when in the working position to force the ground engaging tools mounted thereon into hard ground and then provides movement of the tool carrier assembly in a horizontal operating orientation from the working position to the headland position, and then provides movement of the tool carrier assembly from the operating orientation to the full upright over-centered transport orientation using a single hydraulic cylinder without requiring any re-configuration of parts. A simple and cost-effective implement apparatus is thus provided.

BRIEF DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
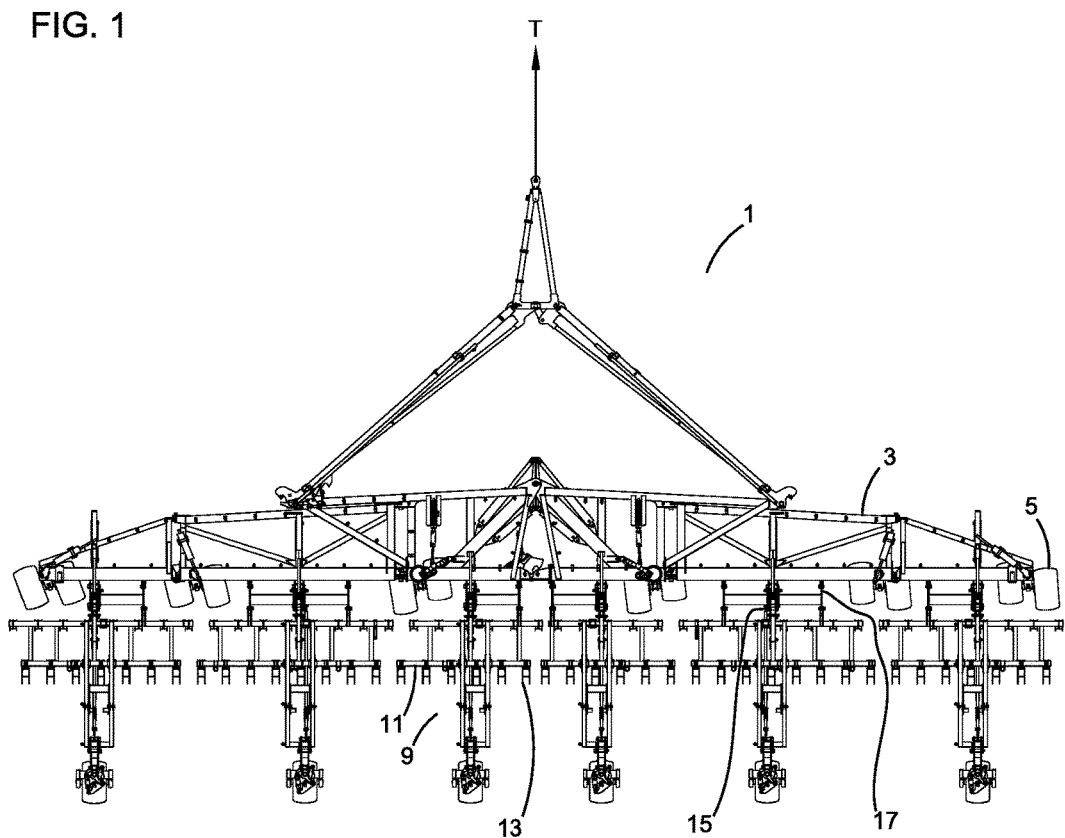
FIG. 1 is a top view of an embodiment of the implement apparatus of the present disclosure.

FIG. 1 illustrates an embodiment of an implement apparatus 1 of the present disclosure comprising a tool bar frame 3 mounted on tool bar wheels 5 for travel along a ground surface 7 in an operating travel direction T. The illustrated tool bar wheels 5 are caster wheels and in some of the drawings the tool bar wheels 5 are shown pivoted somewhat about their caster axes as would be the case when making a turn.

A tool carrier assembly 9 comprises a carrier frame 11 and a plurality of ground engaging tools 13 mounted thereon, and the carrier frame 11 is connected at a front end thereof to the tool bar frame 3 by a carrier control assembly 15. The tool carrier assembly 9 and carrier control assembly 15 are shown in FIGS. 2-7. Typically, as shown in FIG. 1, a plurality of tool carrier assemblies 9 are mounted side by side along a width of the tool bar frame 3, and each is mounted to the tool bar frame 3 by a carrier control assembly 15. Each tool carrier assembly 9 is also connected to the tool bar frame 3 by a hanger assembly 17 described further below. The hanger assembly 17 is shown in the side view of FIG. 2 but has been removed in the similar side views of FIGS. 3-7 to more clearly show the carrier control assembly 15.

The carrier control assembly 15 comprises a crank arm 19 pivotally attached to a rear portion of the tool bar frame 3 about a crank axis CRX oriented substantially horizontally and perpendicular to the operating travel direction T and an extendable hydraulic cylinder 21 attached between the crank arm 19 and the tool bar frame 3 and operative to pivot the crank arm about the crank axis CRX. The carrier frame 11 is pivotally attached at a front end thereof to the crank arm 19 about a carrier axis CAX oriented substantially parallel to the crank axis CRX.

Figure 4:
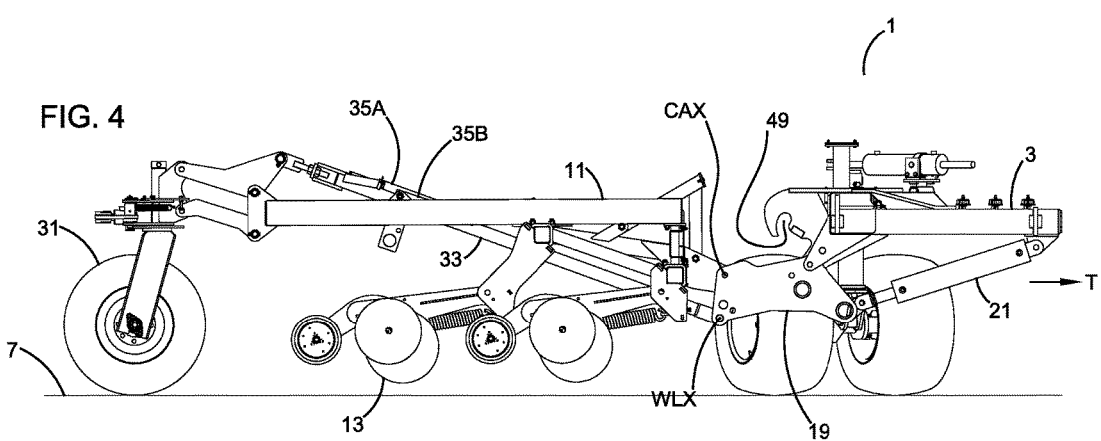
FIG. 4 is a side view of the tool carrier assembly and carrier control shown in an intermediate position.
Figure 4A:
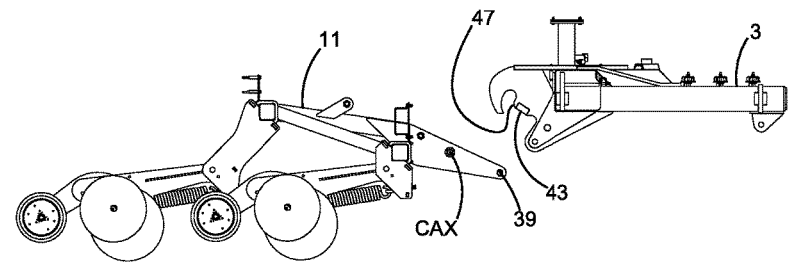
FIG. 4A is a side view showing the position of the roller with respect to the scroll edge of the scroll plate when the tool carrier assembly and carrier control are in the intermediate position of FIG. 4.
Figure 5:
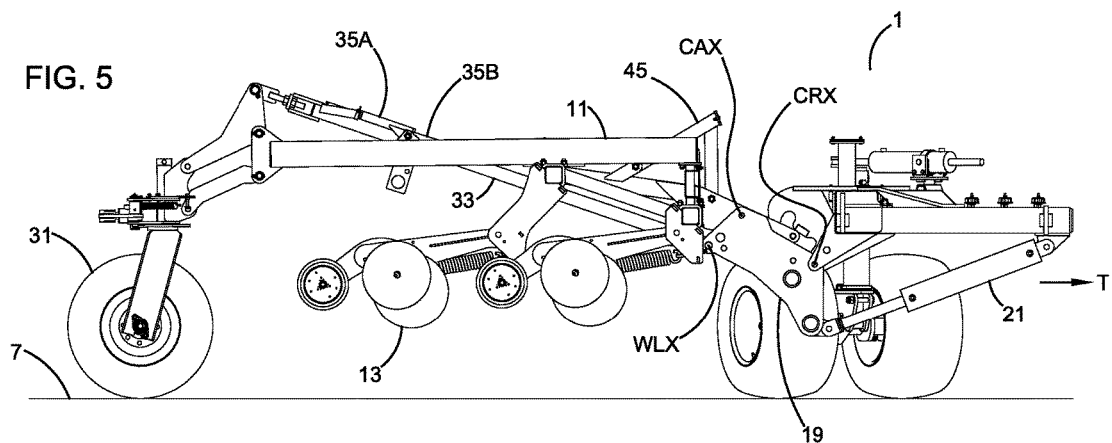
FIG. 5 is a side view of the tool carrier assembly and carrier control shown in the headland position.
Figure 5A:
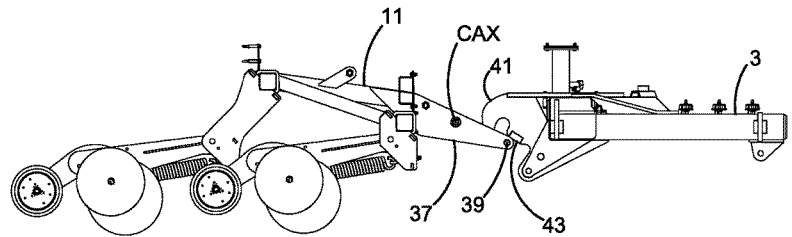
FIG. 5A is a side view showing the position of the roller with respect to the scroll edge of the scroll plate when the tool carrier assembly and carrier control are in the headland position of FIG. 5.
Figure 6:
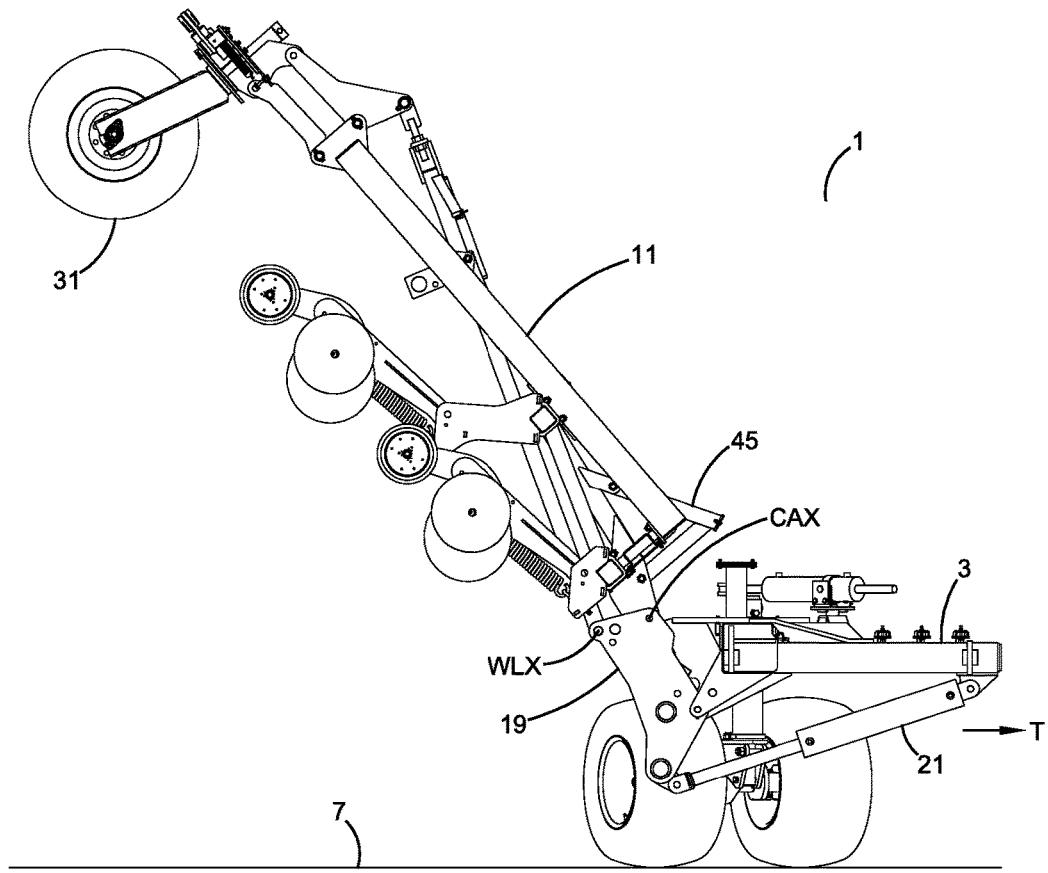
FIG. 6 is a side view of the tool carrier assembly and carrier control shown in an intermediate position between the headland position and the transport orientation.
Figure 6A:
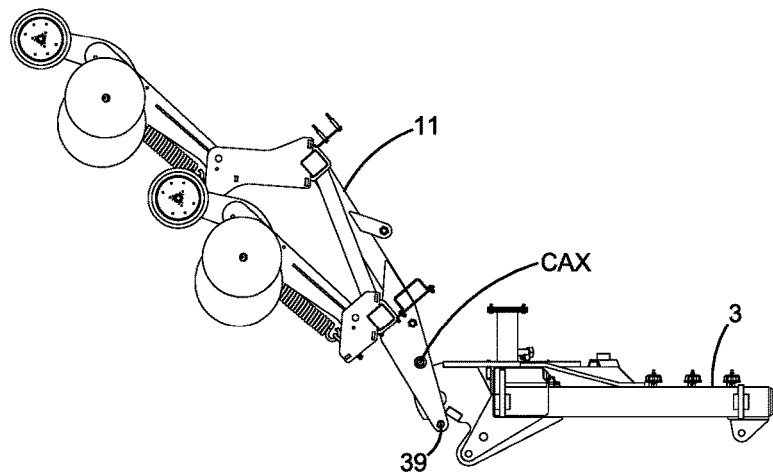
FIG. 6A is a side view showing the position of the roller with respect to the scroll edge of the scroll plate when the tool carrier assembly and carrier control are in the intermediate position of FIG. 6.
Figure 7:
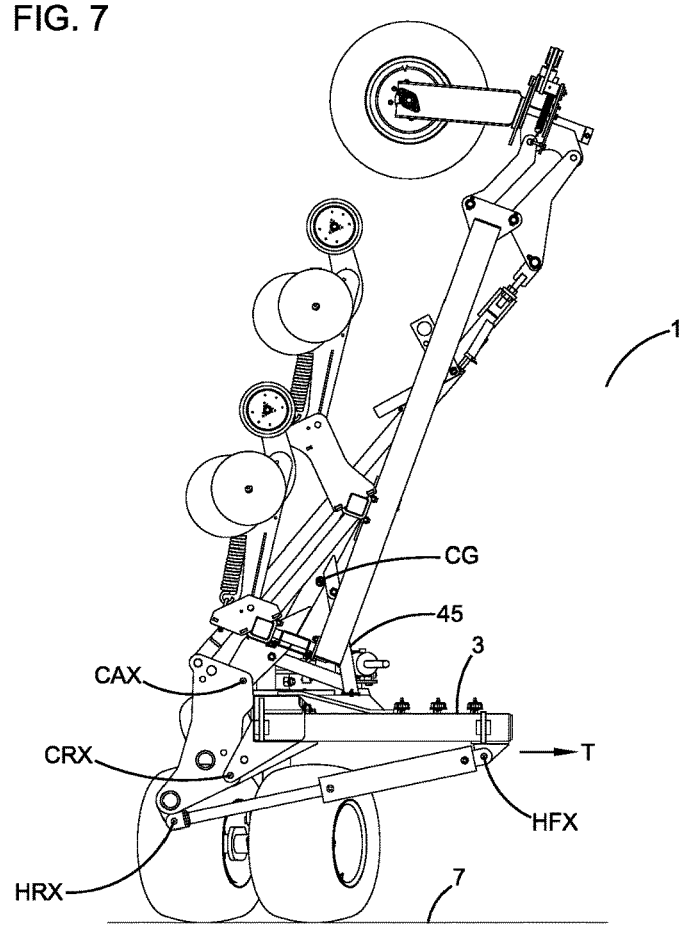
FIG. 7 is a side view of the tool carrier assembly and carrier control shown in the transport orientation.
Figure 7A:
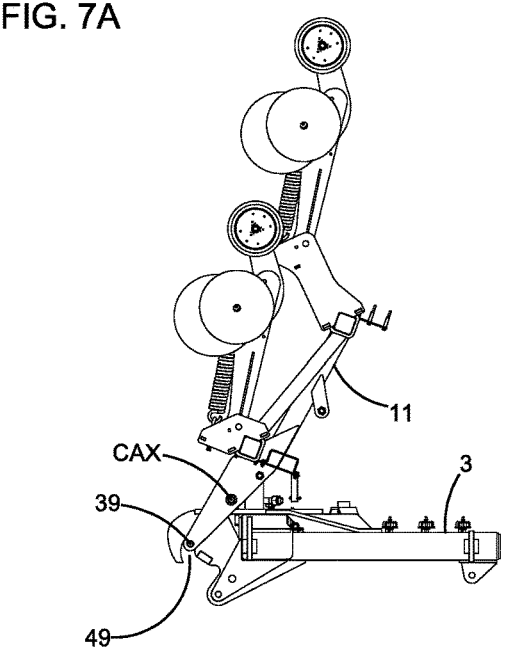
FIG. 7A is a side view showing the position of the roller with respect to the scroll edge of the scroll plate when the tool carrier assembly and carrier control are in the transport orientation of FIG. 7.

The carrier control assembly 15 is configured to move the tool carrier assembly 9 from a transport orientation shown in FIG. 7 extending upward from the tool bar frame 3 through an intermediate position shown in FIG. 6 to an operating orientation shown in FIGS. 2-5 where the tool carrier assembly 9 extends horizontally rearward from the tool bar frame 3.

Figure 2:
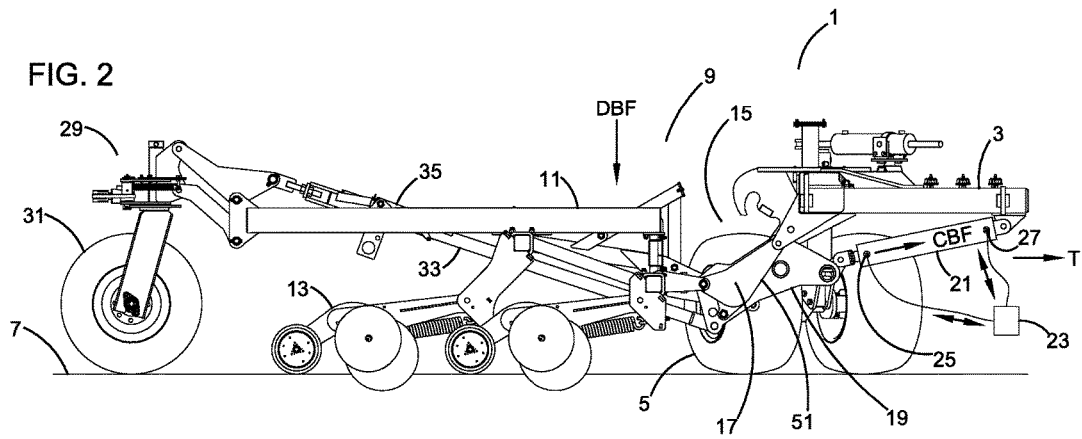
FIG. 2 is a side view of the tool carrier assembly and carrier control of the embodiment of FIG. 1 shown in the working position with the hanger assembly in place, which hanger assembly is removed in the subsequent drawings for clarity of illustration.
Figure 3:
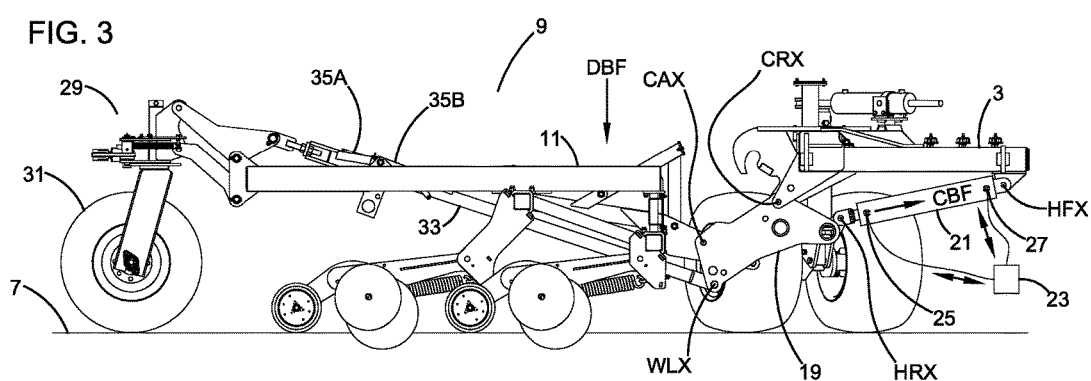
FIG. 3 is a side view of the tool carrier assembly and carrier control shown in the working position of FIG. 2.
Figure 3A:
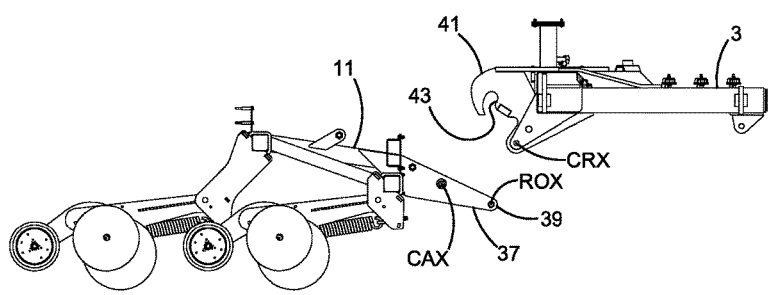
FIG. 3A is a side view showing the position of the roller with respect to the scroll edge of the scroll plate when the tool carrier assembly and carrier control are in the working position of FIG. 3.

The carrier control assembly 15 is further configured such that the hydraulic cylinder 21 is operative to maintain the tool carrier assembly 9 in the operating orientation while moving the tool carrier assembly 9 from a headland position shown in FIG. 5, where the ground engaging tools are above the ground, down through an intermediate position shown in FIG. 4 to a working position shown in FIGS. 2 and 3 where the ground engaging tools 13 penetrate the ground surface 7 to a selected depth. When the tool carrier assembly 9 is in the working position, the hydraulic cylinder 21 is operative to exert a downward bias force DBF on the tool carrier assembly.

When the tool carrier assembly 9 is in the working position of FIGS. 2 and 3, the carrier axis CAX is rearward and below the crank axis CRX, and the hydraulic cylinder 21 is pivotally attached at a forward end thereof to the tool bar frame 3 at pivot HFX, and is pivotally attached at a rearward end thereof to the crank arm 19 at pivot HRX below and forward of the crank axis CRX. When the tool carrier assembly 9 is in the transport orientation shown in FIG. 7, the carrier axis CAX is above the crank axis CRX and the pivot HRX at the rearward end of the extended hydraulic cylinder 21 is below and rearward of the crank axis CRX.

When the tool carrier assembly is in the working position of FIGS. 1 and 2, pressurized hydraulic fluid from a hydraulic fluid source 23 is directed into the rear port 25 of hydraulic cylinder 21 such that the hydraulic cylinder 21 exerts a forward crank bias force CBF on the crank arm 19 at the pivot HRX which in turn causes the downward bias force DBF to be exerted on the carrier frame 11 of the tool carrier assembly 9 at the carrier axis CRX. Hydraulic fluid moves in and out of the front and rear ports 25, 27 of the hydraulic cylinder 21 as the hydraulic cylinder 21 extends and retracts in response to elevation changes in the ground surface 7.

In the illustrated tool carrier assembly 9, a carrier wheel assembly 29 is pivotally attached to a rear end of the tool carrier assembly 9 and configured such that a carrier wheel 31 thereof supports a rear end of the tool carrier assembly 9 when the tool carrier assembly is in the operating orientation of FIGS. 2-5. The carrier control assembly 15 further comprises a wheel link arm 33 pivotally connected at a front end thereof to the crank arm 19 about a link axis WLX oriented parallel to the carrier axis CAX and below the carrier axis CAX when the tool carrier assembly is in the working position of FIGS. 2 and 3. The wheel link arm 33 is pivotally connected at a rear end thereof to the carrier wheel assembly 29.

The wheel link arm 33 is thus configured to move the carrier wheel 31 downward as hydraulic cylinder 21 extends and pivots the rear end of the crank arm 19 upward to move the tool carrier assembly 9 upward from the working position of FIG. 3 to the headland position of FIG. 5. The arrangement of the wheel link arm 33 moves the rear end of the tool carrier assembly 9 upward in concert with the front end thereof and maintains the tool carrier assembly 9 in the operating orientation during the movement from the working position to the headland position.

In order to maintain a desired depth of penetration of the ground engaging tools 13 the wheel link arm 33 of the carrier control assembly 15 bears against a stop 35 when the tool carrier assembly 9 is in the working position with the ground engaging tools 13 penetrating the ground surface 7 to a desired depth.

The illustrated stop 35 comprises a first stop member 35A mounted on the wheel link arm 33 and a second stop 35B member mounted on the tool bar frame 3 and configured such that the first stop member 35A bears against the second stop member 35B when the tool carrier assembly 9 is in the working position and the hydraulic cylinder 21 exerts the downward bias force DBF on the tool carrier assembly 9 by exerting the crank bias force CBF on the crank arm 19, which in turn exerts a forward and downward bias force on the wheel link arm 33 at the link axis WLX and on the carrier frame 11 at the carrier axis CAX. The position of either or both of the first and second stop members 35A, 35B is adjustable to adjust a depth of penetration of the ground engaging tools 13 into the ground surface 7.

The illustrated ground engaging tools 13 are disc furrow openers with packer wheels such as would be used for agricultural seeding operations. In order to provide satisfactory operation, the bottom edges of the ground engaging tools 13 must be maintained on a substantially horizontal common plane while moving upward and downward with respect to the tool bar frame 3 when travelling over undulating terrain or when the depth of penetration is increased or decreased. The illustrated carrier control assembly 15 accomplishes this by maintaining the tool carrier assembly 9 in the operating orientation as same moves up and down with the ground engaging tools 13 in the working position.

The illustrated apparatus 1 allows the hydraulic cylinder 21 to perform the multiple functions of moving the tool carrier assembly 9 between the operating orientation and the transport orientation, moving the tool carrier assembly 9 between the headland and working positions while maintain same in the operating orientation, and transferring weight from the tool bar frame 3 to the tool carrier assembly 9 to exert the downward bias force DBF on the tool carrier assembly 9 to help the ground engaging tools 13 penetrate hard ground surfaces 7.

In order to move the tool carrier assembly 9 between the horizontal operating orientation and the upright transport orientation the illustrated carrier control assembly 15 comprises a roller arm 37 fixed to and extending forward from a front portion of the carrier frame 11 and a roller 39 rotatably mounted to a front end of the roller arm 37 about a roller axis ROX oriented parallel to the crank axis CRX, and a scroll plate 41 fixed to the tool bar frame 3 and oriented such that a curved rear facing scroll edge 43 thereof is oriented vertically. The roller 39 and scroll plate 41 are configured such that the roller 39 is below the scroll edge 43 as the tool carrier assembly 9 moves in the operating orientation between the working position of FIGS. 2 and 3 and the headland position of FIG. 5, and such that as the carrier control assembly 15 moves the tool carrier assembly 9 upward from the operating orientation of FIG. 5 to the transport orientation of FIG. 7 the roller 39 bears against the scroll edge 43 and rolls upward along the scroll edge 43.

Figure 8:
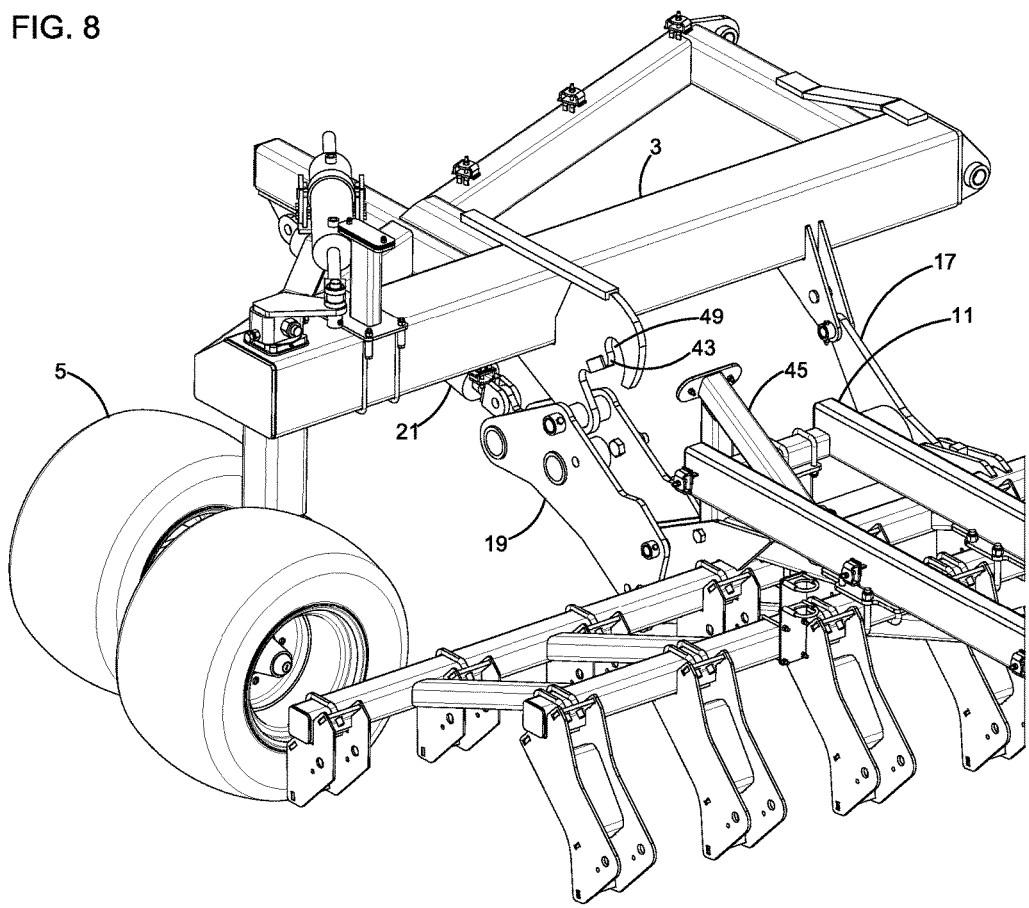
FIG. 8 is an upper rear perspective view of carrier control assembly.
Figure 9:
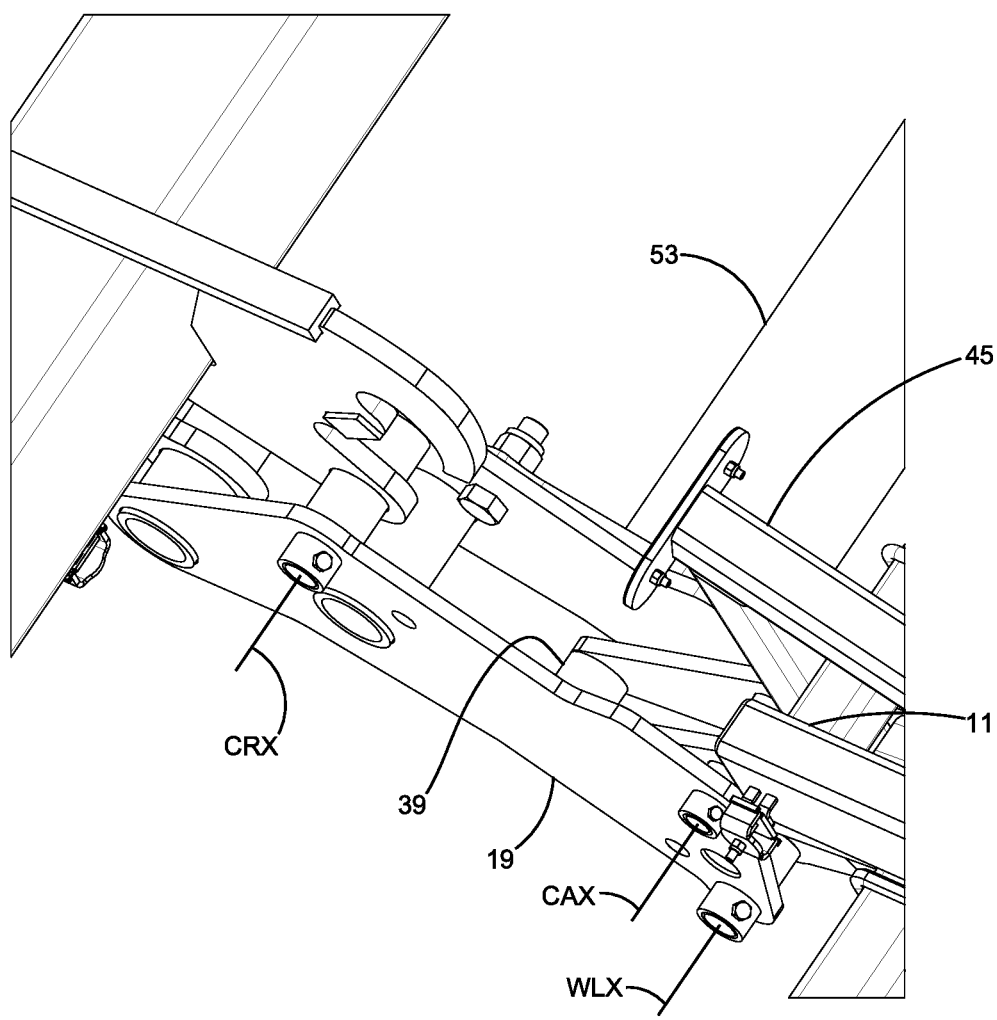
FIG. 9 is an upper side perspective view of the roller and crank arm of the carrier control assembly.
Figure 10:
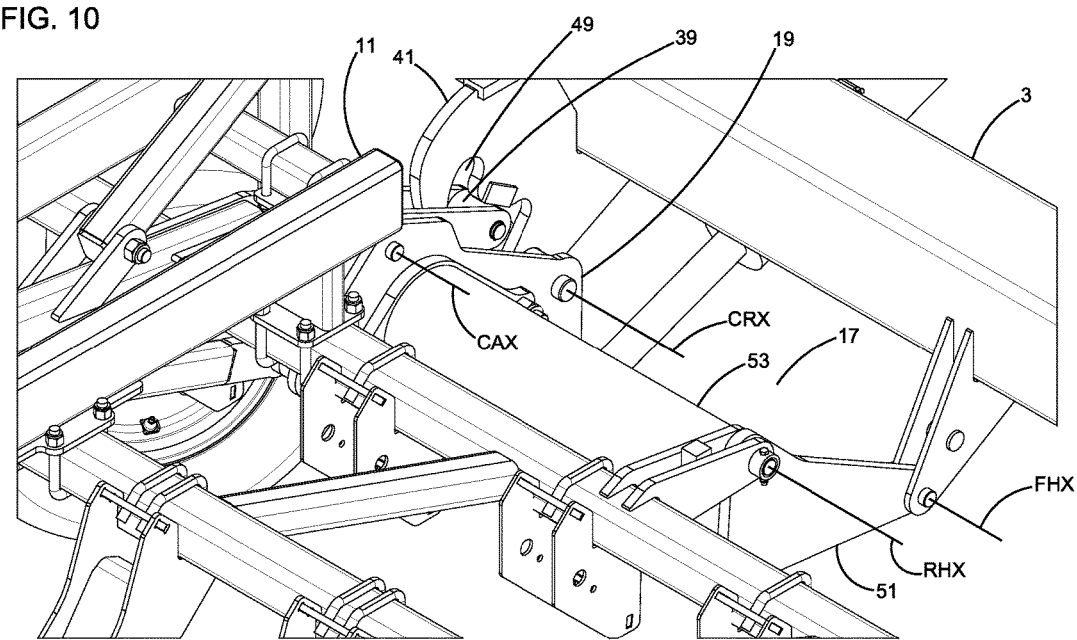
FIG. 10 is an upper rear perspective view of hanger assembly.

For clarity of illustration, in FIGS. 3A, 4A, 5A, 6A, and 7A certain parts of the apparatus 1 have been removed in order to more clearly show the position of the roller 39 relative to the scroll plate 41 when the tool carrier assembly 9 and carrier control assembly 15 are in the corresponding position shown in FIGS. 3, 4, 5, 6, and 7. FIGS. 8-10 also provide views of the carrier control assembly 15 from different angles.

The roller axis ROX is forward of the carrier axis CAX, which here extends through the roller arm 37, when the tool carrier assembly 9 is in the operating orientation of FIGS. 2-5, and as the carrier control assembly 15 moves the tool carrier assembly 9 upward from the operating orientation of FIG. 5 to the intermediate position of FIG. 6 on the way to the transport orientation of FIG. 7 the roller 39 bears against the scroll edge 43 and the tool carrier assembly 9 pivots upward about the carrier axis CAX and the roller axis ROX as the roller 39 rolls along the scroll edge 43. With the illustrated arrangement a relatively small pivoting movement of the crank arm 19 about the crank axis CRX in response to a relatively small extension of the hydraulic cylinder 21 causes a relatively large pivotal movement of the tool carrier assembly 9 between the operating orientation and the transport orientation. The illustrated scroll edge 43 curves upward and rearward to an apex 47 and then upward and forward from the apex 47.

In the carrier control assembly 15, the curved rear facing scroll edge 43 is formed by a forward side edge of a scroll slot 49 defined by the scroll plate 41 with an open bottom end, a closed top end, and a rearward side edge. The roller 39 bears against and rolls upward along the scroll edge 43 provided by the forward side edge of the scroll slot 49 as the tool carrier assembly 9 moves upward from the position shown in FIG. 6 to a balanced position and as the tool carrier assembly 9 moves beyond the balanced position a center of gravity CG of the tool carrier assembly 9 draws the tool carrier assembly 9 forward toward the transport orientation shown in FIG. 7 and the roller 39 bears against and rolls upward along the rearward side edge of the scroll slot 49.

A transport rest arm 45 is fixed to the tool carrier assembly 9 and is configured to bear against the tool bar frame 3 when the tool carrier assembly 9 is in the transport orientation such that the weight of the tool carrier frame 9 is supported on the transport rest arm 45. The configuration can be such that roller 39 is in the middle of the scroll slot 49 at this point and not bear the weight of the tool carrier frame 9.

As mentioned above, a hanger assembly 17 is laterally spaced from the carrier control assembly 15 and is operative keep right and left sides of the tool carrier assembly in substantially the same relationship with respect to the tool bar frame 3. The hangar assembly 17 comprises a hanger arm 51 pivotally attached to the tool bar frame 3 about a front hanger axis FHX aligned with the crank axis CRX, and the tool carrier assembly 9 is pivotally attached to the hanger arm 51 about a rear hanger axis RHX aligned with the carrier axis CAX. A relatively large diameter torque tube 53 is fixed rigidly at a first end thereof to the crank arm 19 and a fixed rigidly at a second end thereof to the hanger arm 51 so that the movement of the crank arm 19 causes substantially the same movement of the hanger arm 51.

The present disclosure provides a simple and economical implement apparatus with a carrier control assembly 15 that provides firstly a downward bias force on the tool carrier assembly when in the working position shown in FIGS. 2 and 3, and secondly then provides movement of the tool carrier assembly 9 in a horizontal operating orientation from the working position to the headland position shown in FIG. 5, and thirdly then provides movement of the tool carrier assembly 9 from the operating orientation to the full upright over-centered transport orientation shown in FIG. 7 using a single hydraulic cylinder 21 without any re-configuration of parts.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. An implement apparatus comprising:
   a tool bar frame mounted on tool bar wheels for travel along a ground surface in an operating travel direction;
   a tool carrier assembly comprising a carrier frame and a plurality of ground engaging tools mounted thereon, the carrier frame connected at a front end thereof to the tool bar frame by a carrier control assembly;
   wherein the carrier control assembly comprises a crank arm pivotally attached to a rear portion of the tool bar frame about a crank axis oriented substantially horizontally and perpendicular to the operating travel direction, and an extendable hydraulic cylinder attached between the crank arm and the tool bar frame and operative to pivot the crank arm about the crank axis;
   wherein the carrier frame is pivotally attached at a front end thereof to the crank arm about a carrier axis oriented substantially parallel to the crank axis;
   wherein the carrier control assembly is configured to move the tool carrier assembly from a transport orientation extending upward from the tool bar frame to an operating orientation extending substantially horizontally rearward from the tool bar frame;
   wherein the carrier control assembly is configured to maintain the tool carrier assembly in the operating orientation while moving the tool carrier assembly from a headland position, where the ground engaging tools are above the ground, down to a working position where the ground engaging tools penetrate the ground surface; and
   wherein the carrier control assembly is configured such that when the tool carrier assembly is in the working position, the hydraulic cylinder is operative to exert a downward bias force on the tool carrier assembly, and comprising a roller arm fixed to and extending forward from a front portion of the carrier frame and a roller rotatably mounted to a front end of the roller arm about a roller axis oriented parallel to the crank axis, and a scroll plate fixed to the tool bar frame and oriented such that a curved rear facing scroll edge thereof is oriented substantially vertically, wherein the roller and scroll plate are configured such that the roller is below the scroll edge as the tool carrier assembly moves between the working position and the headland position, and such that as the carrier control assembly moves the tool carrier assembly upward from the operating orientation toward the transport orientation the roller bears against the scroll edge and rolls upward along the scroll edge.

2. The apparatus of claim 1 wherein when the tool carrier assembly is in the working position, the carrier axis is rearward of the crank axis and the hydraulic cylinder is pivotally attached at a forward end thereof to the tool bar frame, and is pivotally attached at a rearward end thereof to the crank arm below and forward of the crank axis.

3. The apparatus of claim 2 wherein when the tool carrier assembly is in the transport orientation, the carrier axis is above the crank axis and the rearward end of the hydraulic cylinder is below and rearward of the crank axis.

4. The apparatus of claim 1 wherein when the tool carrier assembly is in the working position, pressurized hydraulic fluid is directed into the hydraulic cylinder such that the hydraulic cylinder exerts the downward bias force on the tool carrier assembly and such that hydraulic fluid moves in and out of the hydraulic cylinder as the hydraulic cylinder extends and retracts in response to elevation changes in the ground surface.

5. The apparatus of claim 1 wherein the roller axis is forward of the carrier axis when the tool carrier assembly is in the operating orientation, and as the carrier control assembly moves the tool carrier assembly upward from the operating orientation toward the transport orientation the roller bears against the scroll edge and the tool carrier assembly pivots upward about the carrier axis and the roller axis as the roller rolls along the scroll edge.

6. The apparatus of claim 5 wherein the carrier axis extends through the roller arm.

7. The apparatus of claim 5 wherein the curved rear facing scroll edge is formed by a forward side edge of a scroll slot defined by the scroll plate, the scroll slot having an open bottom end, a closed top end, and a rearward side edge.

8. The apparatus of claim 7 wherein as the roller bears against and rolls upward along the forward side edge of the scroll slot, the tool carrier assembly moves upward to a balanced position, and as the tool carrier assembly moves beyond the balanced position a center of gravity of the tool carrier assembly draws the tool carrier assembly forward toward the transport orientation and the roller bears against and rolls upward along the rearward side edge of the scroll slot.

9. The apparatus of claim 8 comprising a transport rest arm fixed to the tool carrier assembly and configured to bear against the tool bar frame when the tool carrier assembly is in the transport orientation.

10. An implement apparatus comprising:
a tool bar frame mounted on tool bar wheels for travel along a ground surface in an operating travel direction;
a tool carrier assembly comprising a carrier frame and a plurality of ground engaging tools mounted thereon, the carrier frame connected at a front end thereof to the tool bar frame by a carrier control assembly;
wherein the carrier control assembly comprises a crank arm pivotally attached to a rear portion of the tool bar frame about a crank axis oriented substantially horizontally and perpendicular to the operating travel direction, and an extendable hydraulic cylinder attached between the crank arm and the tool bar frame and operative to pivot the crank arm about the crank axis;
wherein the carrier frame is pivotally attached at a front end thereof to the crank arm about a carrier axis oriented substantially parallel to the crank axis;
wherein the carrier control assembly is configured to move the tool carrier assembly from a transport orientation extending upward from the tool bar frame to an operating orientation extending substantially horizontally rearward from the tool bar frame;
wherein the carrier control assembly is configured to maintain the tool carrier assembly in the operating orientation while moving the tool carrier assembly from a headland position, where the ground engaging tools are above the ground, down to a working position where the ground engaging tools penetrate the ground surface; and
wherein the carrier control assembly is configured such that when the tool carrier assembly is in the working position, the hydraulic cylinder is operative to exert a downward bias force on the tool carrier assembly, and comprising a carrier wheel assembly pivotally attached to a rear end of the tool carrier assembly and configured such that a carrier wheel of the carrier wheel assembly supports a rear end of the tool carrier assembly when the tool carrier assembly is in the operating orientation, and the carrier control assembly comprises a wheel link arm pivotally connected at a front end thereof to the crank arm about a link axis oriented parallel to the carrier axis and below the carrier axis when the tool carrier assembly is in the working position, and pivotally connected at a rear end thereof to the carrier wheel assembly, wherein the wheel link arm is configured to move the carrier wheel downward as the tool carrier assembly moves upward from the working position to the headland position.

11. The apparatus of claim 10 wherein the carrier control assembly bears against a stop when the tool carrier assembly is in the working position, and wherein a position of the stop can be adjusted to adjust a depth of penetration of the ground engaging tools into the ground surface.

12. The apparatus of claim 11 wherein the stop comprises a first stop member mounted on the wheel link arm and a second stop member mounted on the tool bar frame and configured such that the first stop member bears against the second stop member when the tool carrier assembly is in the working position and wherein the hydraulic cylinder exerts the downward bias force on the tool carrier assembly by exerting a crank bias force on the crank arm.

13. The apparatus of claim 12 wherein a position of one of the first and second stop members is adjustable.

14. An implement apparatus comprising:
a tool bar frame mounted on tool bar wheels for travel along a ground surface in an operating travel direction;
a tool carrier assembly comprising a carrier frame and a plurality of ground engaging tools mounted thereon, the carrier frame connected at a front end thereof to the tool bar frame by a carrier control assembly;
wherein the carrier control assembly comprises a crank arm pivotally attached to a rear portion of the tool bar frame about a crank axis oriented substantially horizontally and perpendicular to the operating travel direction, and an extendable hydraulic cylinder attached between the crank arm and the tool bar frame and operative to pivot the crank arm about the crank axis;
wherein the carrier frame is pivotally attached at a front end thereof to the crank arm about a carrier axis oriented substantially parallel to the crank axis;
wherein the carrier control assembly is configured to move the tool carrier assembly from a transport orientation extending upward from the tool bar frame to an operating orientation extending substantially horizontally rearward from the tool bar frame;
wherein the carrier control assembly is configured to maintain the tool carrier assembly in the operating orientation while moving the tool carrier assembly from a headland position, where the ground engaging tools are above the ground, down to a working position where the ground engaging tools penetrate the ground surface; and
wherein the carrier control assembly is configured such that when the tool carrier assembly is in the working position, the hydraulic cylinder is operative to exert a downward bias force on the tool carrier assembly, and comprising a hanger assembly laterally spaced from the carrier control assembly, the hanger assembly comprising a hanger arm pivotally attached to the tool bar frame about a front hanger axis aligned with the crank axis, and wherein the tool carrier assembly is pivotally attached to the hanger arm about a rear hanger axis aligned with the carrier axis, and the hanger assembly comprises a torque tube fixed at a first end thereof to the crank arm and a fixed at a second end thereof to the hanger arm.

15. An implement apparatus comprising:
a tool bar frame mounted on tool bar wheels for travel along a ground surface in an operating travel direction;
a tool carrier assembly comprising a carrier frame and a plurality of ground engaging tools mounted thereon;
a carrier control assembly comprising a crank arm pivotally attached to a rear portion of the tool bar frame about a crank axis oriented substantially horizontally and perpendicular to the operating travel direction, and an extendable hydraulic cylinder attached between the crank arm and the tool bar frame and operative to pivot the crank arm about the crank axis;
wherein the carrier frame is pivotally attached at a front end thereof to the crank arm about a carrier axis oriented substantially parallel to the crank axis;
wherein the carrier control assembly is configured such that when the hydraulic cylinder is in an extended position the tool carrier assembly is in a transport orientation extending upward from the tool bar frame, and such that retracting the hydraulic cylinder to a first retracted position moves the tool carrier assembly to an operating orientation extending substantially horizontally rearward from the tool bar frame;
wherein the carrier control assembly is configured such that the tool carrier assembly is maintained in the operating orientation when the hydraulic cylinder is further retracted from the first retracted position to move the tool carrier assembly from a headland position, where the ground engaging tools are above the ground, down to a working position where the ground engaging tools penetrate the ground surface; and wherein the carrier control assembly is configured such that when the tool carrier assembly is in the working position, pressurized hydraulic fluid is directed into the hydraulic cylinder such that the hydraulic cylinder exerts a downward bias force on the tool carrier assembly and such that hydraulic fluid moves in and out of the hydraulic cylinder as the tool carrier assembly moves up and down and the hydraulic cylinder extends and retracts in response to elevation changes in the ground surface, and comprising a carrier wheel assembly pivotally attached to a rear end of the tool carrier assembly and configured such that a carrier wheel of the carrier wheel assembly supports a rear end of the tool carrier assembly when the tool carrier assembly is in the operating orientation, and the carrier control assembly comprises a wheel link arm pivotally connected at a front end thereof to the crank arm about a link axis oriented parallel to the carrier axis and below the carrier axis when the tool carrier assembly is in the working position, and pivotally connected at a rear end thereof to the carrier wheel assembly, wherein the wheel link arm is configured to move the carrier wheel downward as the tool carrier assembly moves upward from the working position to the headland position.

16. The apparatus of claim 15 wherein the carrier control assembly bears against a stop when the tool carrier assembly is in the working position, and wherein a position of the stop can be adjusted to adjust a depth of penetration of the ground engaging tools into the ground surface.

17. The apparatus of claim 15 comprising a roller arm fixed to and extending forward from a front portion of the carrier frame and a roller rotatably mounted to a front end of the roller arm about a roller axis oriented parallel to the crank axis, and a scroll plate fixed to the tool bar frame and oriented such that a curved rear facing scroll edge thereof is oriented substantially vertically, wherein the roller and scroll plate are configured such that the roller is below the scroll edge as the tool carrier assembly moves between the working position and the headland position, and such that as the carrier control assembly moves the tool carrier assembly upward from the operating orientation toward the transport orientation the roller bears against the scroll edge and rolls upward along the scroll edge.

18. The apparatus of claim 17 wherein the roller axis is forward of the carrier axis when the tool carrier assembly is in the operating orientation, and as the carrier control assembly moves the tool carrier assembly upward from the operating orientation toward the transport orientation the roller bears against the scroll edge and the carrier frame pivots upward about the carrier axis and the roller axis as the roller rolls along the scroll edge.

19. The apparatus of claim 18 wherein the carrier axis extends through the roller arm.

20. The apparatus of claim 18 wherein the curved rear facing scroll edge is formed by a forward side edge of a scroll slot defined by the scroll plate, the scroll slot having an open bottom end, a closed top end, and a rearward side edge.

21. The apparatus of claim 20 wherein as the roller bears against and rolls upward along the forward side edge of the scroll slot, the tool carrier assembly moves upward to a balanced position, and as the tool carrier assembly moves beyond the balanced position a center of gravity of the tool carrier assembly draws the tool carrier assembly forward toward the transport orientation and the roller bears against and rolls upward along the rearward side edge of the scroll slot.

22. The apparatus of claim 21 comprising a transport rest arm fixed to the tool carrier assembly and configured to bear against the tool bar frame when the tool carrier assembly is in the transport orientation.

* * * * *